United States Patent
Shih

(10) Patent No.: US 6,718,576 B1
(45) Date of Patent: Apr. 13, 2004

(54) MATTRESS PAD FOR VEHICLE HAVING LIGHT MEMBERS

(76) Inventor: Jen Hsieh Shih, P.O. Box 63-298, Taichung (TW), 406

( * ) Notice: Subject to any disclaimer, the term of this patent is extended or adjusted under 35 U.S.C. 154(b) by 0 days.

(21) Appl. No.: 10/356,244

(22) Filed: Jan. 30, 2003

(51) Int. Cl.$^7$ .............................. A47G 9/06; B60Q 3/00
(52) U.S. Cl. .................. 5/417; 5/420; 5/905; 362/488; 362/545
(58) Field of Search .................................. 362/545, 486, 362/487, 488; 5/905, 420, 417

(56) References Cited

U.S. PATENT DOCUMENTS

| | | | |
|---|---|---|---|
| 6,481,877 B1 | * | 11/2002 | Bello, Jr. ..................... 362/488 |
| 2003/0002273 A1 | * | 1/2003 | Anderson et al. ............. 362/84 |

FOREIGN PATENT DOCUMENTS

| | | | | |
|---|---|---|---|---|
| JP | 2001088597 A | * | 4/2001 | ............ B60N/3/04 |
| JP | 2001341571 A | * | 12/2001 | ............ B60N/3/04 |
| JP | 2002225500 A | * | 8/2002 | ............ B44F/1/08 |

* cited by examiner

*Primary Examiner*—Teri Pham Luu

(57) ABSTRACT

A mattress pad for vehicle includes a pad member, and a light device having one or more light members attached to the pad member, to generate light through the pad member, and to light or illuminate the inner portions of vehicles, particularly the dark inner portion of the vehicle. The pad member includes one or more swellings each having a space to receive the light member, and each having one or more flanges to engage with and to retain the light members in the swellings of the pad member. The light members each may include a cover secured onto a base to receive one or more circuit boards and one or more light elements.

7 Claims, 6 Drawing Sheets

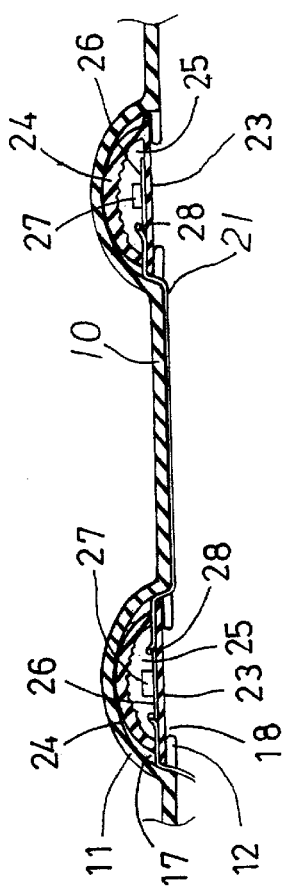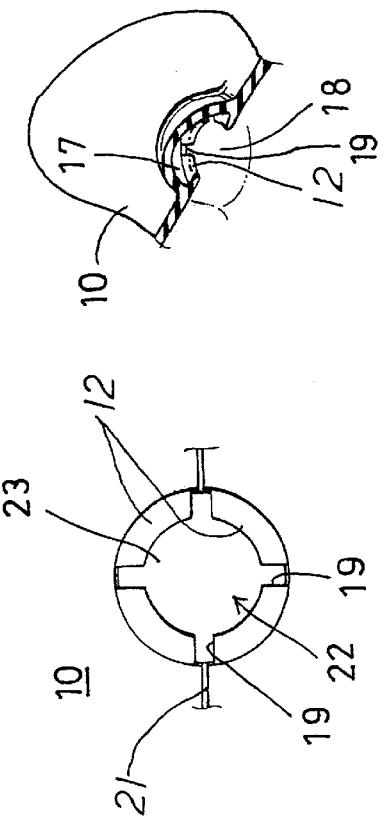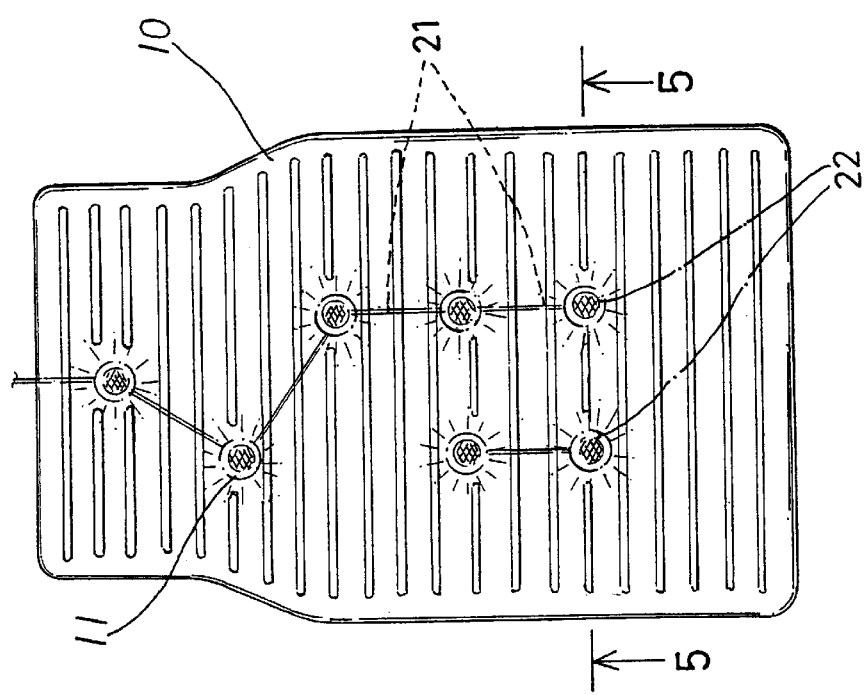

US 6,718,576 B1

MATTRESS PAD FOR VEHICLE HAVING LIGHT MEMBERS

BACKGROUND OF THE INVENTION

1. Field of the Invention

The present invention relates to a mattress pad for vehicle, and more particularly to a mattress pad for vehicle having light members for lighting or illumination purposes.

2. Description of the Prior Art

Various kinds of typical mattress pads have been developed for attaching to floor portions of vehicles. However, the typical mattress pads have no light members and may not generate warning lights. Normally, the floor portions of the vehicles may be dark, particularly during the night, such that people may not clearly see the inner portion of the vehicle during the night.

The present invention has arisen to mitigate and/or obviate the afore-described disadvantages of the conventional dark inner portions of vehicles.

SUMMARY OF THE INVENTION

The primary objective of the present invention is to provide a mattress pad for vehicle including a number of light members for generating lights to light or illuminate the inner portions of vehicles.

In accordance with one aspect of the invention, there is provided a mattress pad for vehicle comprising a pad member, and a light device attached to the pad member, to generate light through the pad member, and for generating lights to light or illuminate the inner portions of vehicles. Particularly, the light generated by the light device may be used to light the dark inner portion of the vehicle.

The pad member includes a bottom portion, the light device includes at least one light member attached to the bottom portion of the pad member. The pad member includes at least one swelling provided therein and having a space formed in the swelling to receive the light member.

The pad member includes an opening formed in the swelling and communicating with the space of the swelling to receive the light member. The pad member includes one or more flanges extended into the space thereof to engage with the light member, and to retain the light member in the swelling of the pad member.

The light member includes a base, a circuit board attached to the base and having at least one light element disposed thereon. The circuit board includes at least one terminal provided thereon, and a flexible and electrical cable coupled to the terminal of the circuit board.

The base of the light member includes an upper portion, and the light member includes a cover secured onto the upper portion of the base, to form and define a chamber within and between the cover and the base.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is an upper plan view of the mattress pad for the vehicle;

FIG. 4 is an enlarged partial perspective view of the mattress pad, in which a portion of the mattress pad is cut off for showing the inner structure of the mattress pad;

FIG. 5 is a partial cross sectional view of the light members, taken along lines 5—5 of FIG. 2;

FIG. 6 is a partial bottom plan view of the mattress pad for the vehicle;

DETAILED DESCRIPTION OF THE PREFERRED EMBODIMENT

Figure 1:
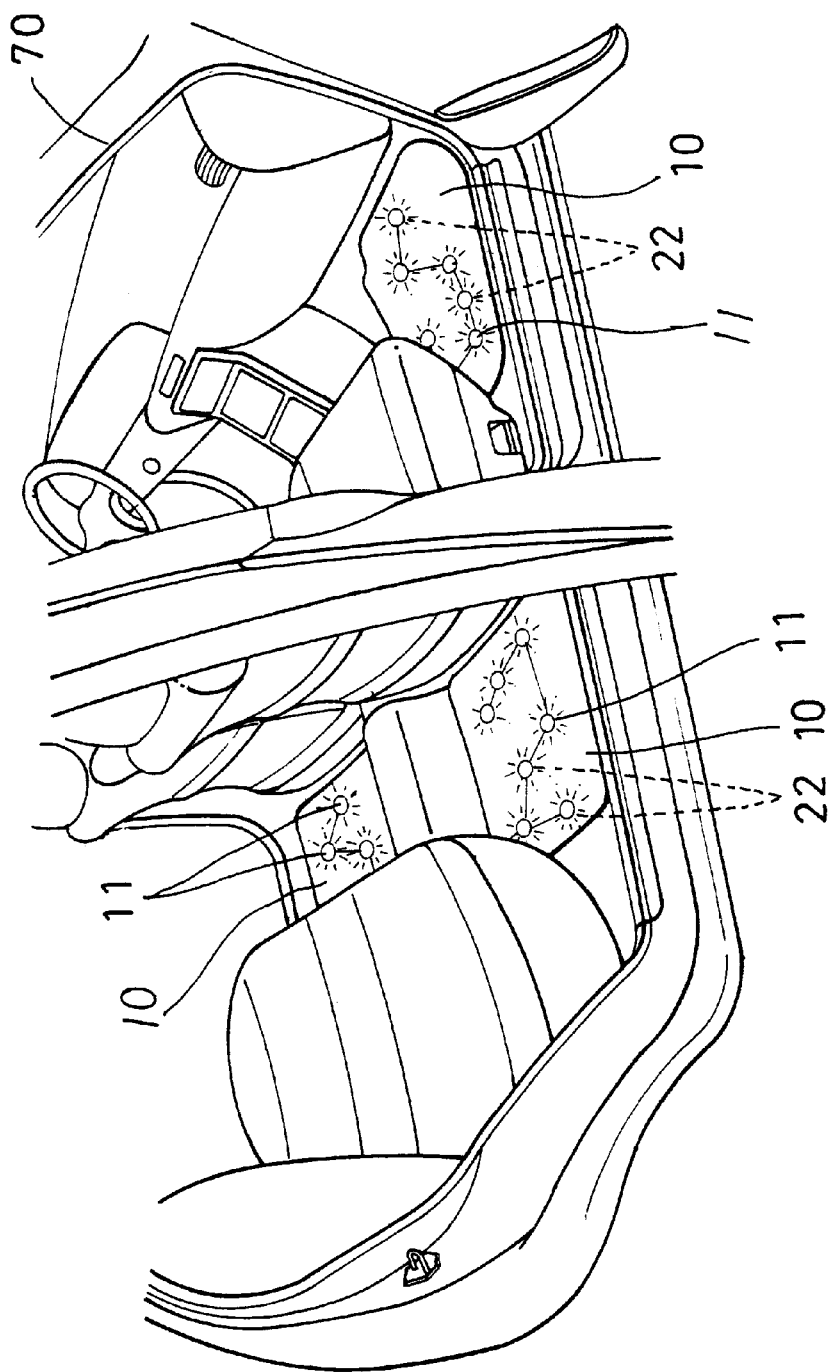
FIG. 1 is a partial perspective view of a vehicle including one or more mattress pad in accordance with the present invention each having a number of light members attached or secured thereto for lighting or illuminating purposes.

Referring to the drawings, and initially to FIGS. 1–7, a mattress pad for a vehicle 70 in accordance with the present invention comprises a pad body 10 to be disposed in the floor portion of the vehicle 70, and including one or more upwardly curved or convex swellings 11 formed or extended upwardly therefrom, and a light device 20 having a number of light members 22 to be arranged and secured onto or into the bottom of the pad body 10, or engaged into the swellings 11 of the pad body 10, for generating light to light the inner portion of the vehicle 70.

As shown in FIGS. 3–7, the pad body 10 includes a space 17 formed in each of the swellings 11 to receive the respective light member 22 therein, and an opening 18 formed therein and communicating with the space 17 thereof, and one or more flanges 12 extended into the opening 18 of each of the swellings 11, to form or define one or more gaps 19 between the flanges 12. The pad body 10 is made of rubber or plastic or resilient materials, such that the pad body 10 and the flanges 12 are flexible. The flanges 12 may engage with the light members 22, to detachably retain the light members 22 within the spaces 17 of the swellings 11 respectively.

The light members 22 of the light device 20 are separate individuals and are flexibly coupled together with flexible and electrical wires or cables 21, such that the light members 22 of the light device 20 may be easily arranged and engaged into the selected swellings 11 of the pad body 10 of the mattress pad. The pad body 10 and/or the swellings 111 of the pad body 10 are made of transparent or semi-transparent materials, for allowing the lights generated by the light members 22 to emit through the pad body 10 and/or the swellings 11 of the pad body 10.

The light members 22 of the light device 20 each includes a planar base 23, and a curved and transparent or semi-transparent or convex cover 24 secured onto the upper portion of the planar base 23 by such as ultrasonic welding processes, in order to form or define a chamber 25 within or between the planar base 23 and the curved cover 24.

A circuit board 26 is engaged in the chamber 25 of each of the light members 22 of the light device 20, and preferably engaged with or contacted with the base 23, and includes one or more light elements 27, such as light emitting diodes, liquid crystal displays, illuminant materials, etc. secured thereon, for generating warning lights, for example.

The circuit boards 26 each may further include one or more conductors or terminals 28 provided thereon for electrically coupling to the flexible and electrical wires or cables 21, which may be coupled to the electric power source of the vehicle or to the batteries, for energizing the light members 22 of the light device 20. The electric cables 21 may be received in or engaged through the opening 18 of each of the swellings 11, and/or the gaps 19 formed or defined between the flanges 12.

Figure 3:
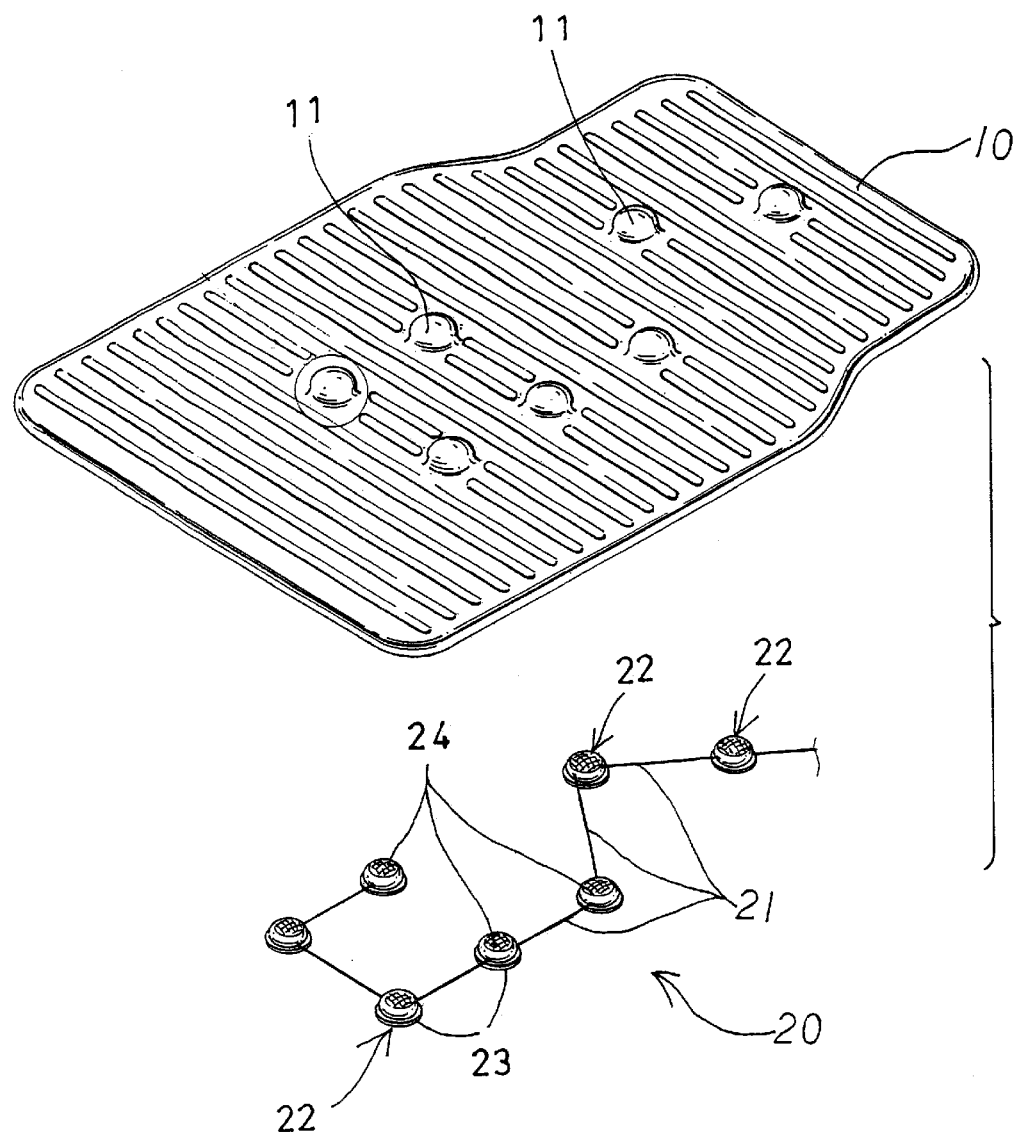
FIG. 3 is a partial exploded view of the mattress pad for the vehicle.
Figure 8:
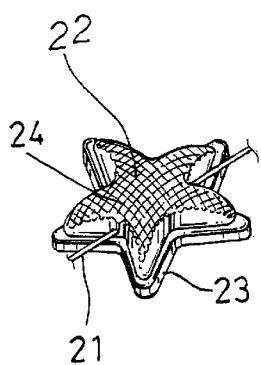
FIG. 8 is a perspective view illustrating the other shape of the light members for attaching to the mattress pad for the vehicle.
Figure 7:
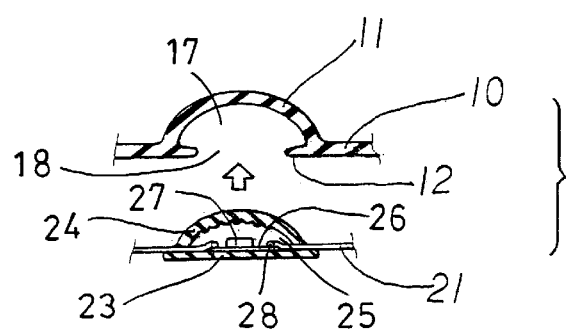
FIG. 7 is a partial exploded and cross sectional view of the light members.

The light members 22 of the light device 20 may be shaped or arranged in the circular shape or outer contour as shown in FIGS. 1–3. As shown in FIG. 8, the light members 22 of the light device 20 may also be shaped or arranged in the other shapes or outer contours, such as the star shape as shown in FIG. 8, or the other geometric shapes or contours or patterns.

It is preferable that the bases 23 and the covers 24 of the light members 22 of the light device 20 are made of flexible materials, for allowing the light members 22 of the light device 20 to be slightly deformed and for preventing the light members 22 from being broken after being stepped or depressed by users.

Figure 9:
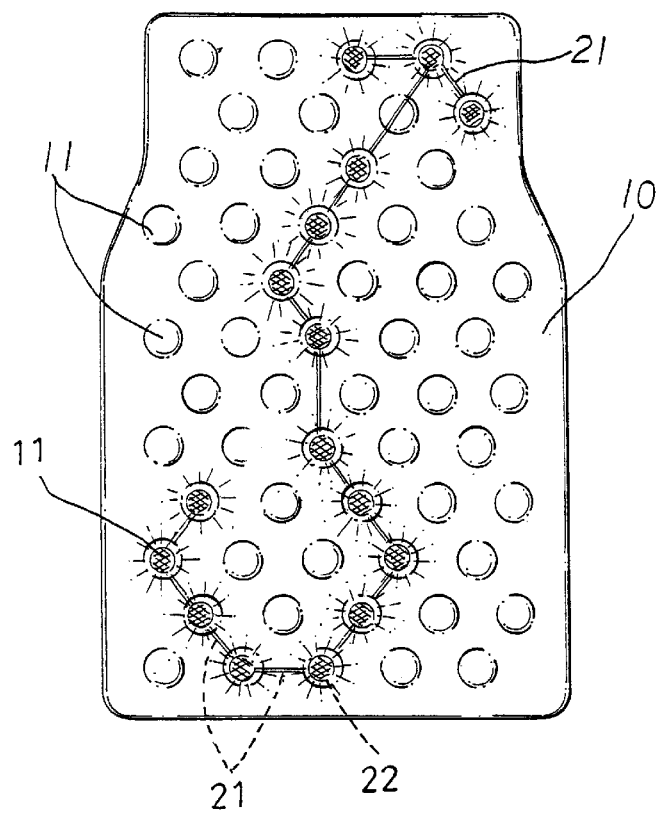
FIG. 9 is an upper plan view of the mattress pad similar to FIG. 2, illustrating the other arrangement or contour of the mattress pad.

Referring next to FIG. 9, the pad body 10 may include a number of swellings 11 formed or provided therein, and the light members 22 of the light device 20 may be engaged into any or selected swellings 11, and may be arranged into any selected pattern.

Figure 10:
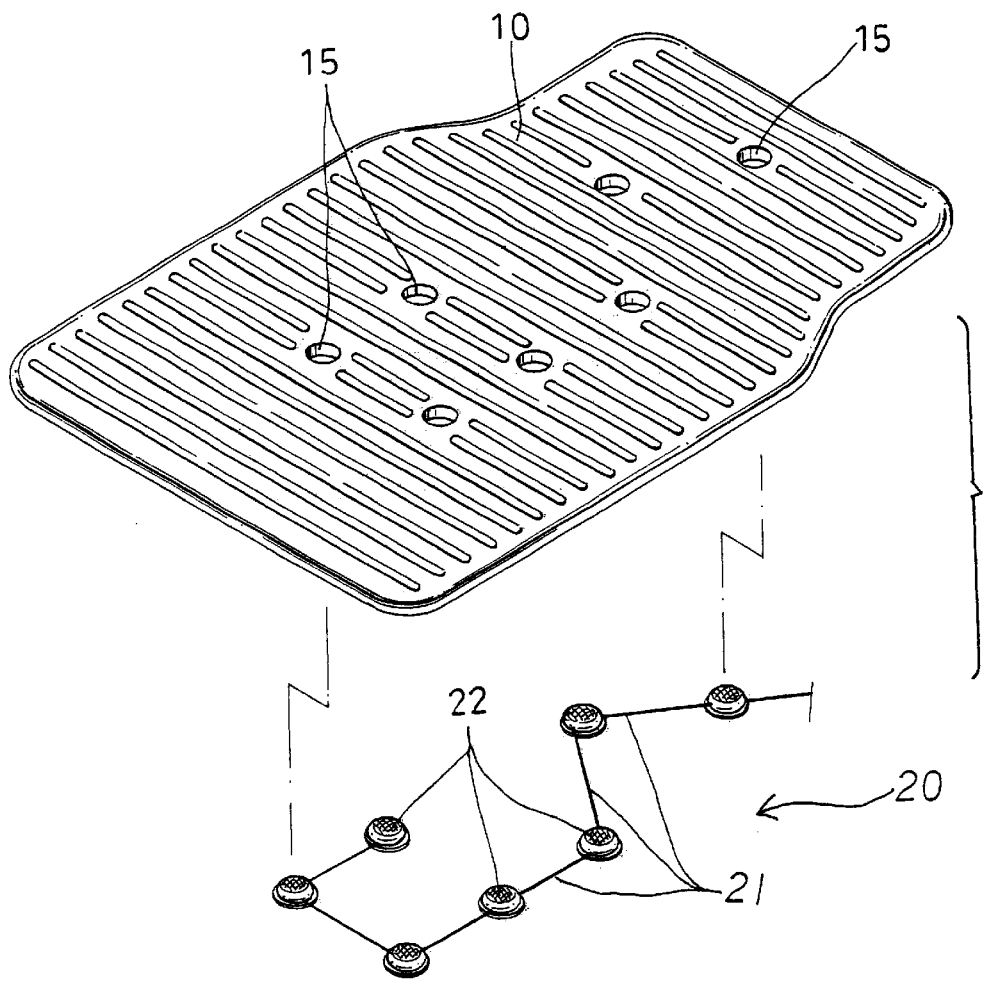
FIG. 10 is a partial exploded view similar to FIG. 3, illustrating the further arrangement or structure of the mattress pad.
Figure 11:
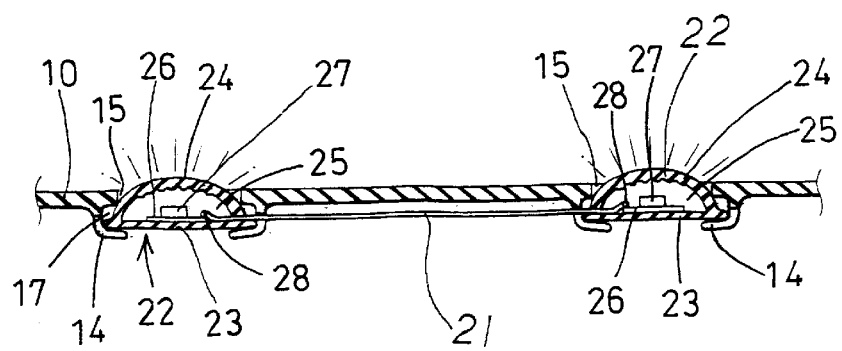
FIG. 11 is a partial cross sectional view of the mattress pad as shown in FIG. 10.

Referring next to FIGS. 10 and 11, the pad body 10 may include a number of orifices 15 formed or provided therein, to partially receive the light members 22 of the light device 20, and for allowing the light members 22 of the light device 20 to be partially extended or exposed through the orifices 15 of the pad body 10 respectively.

Figure 12:
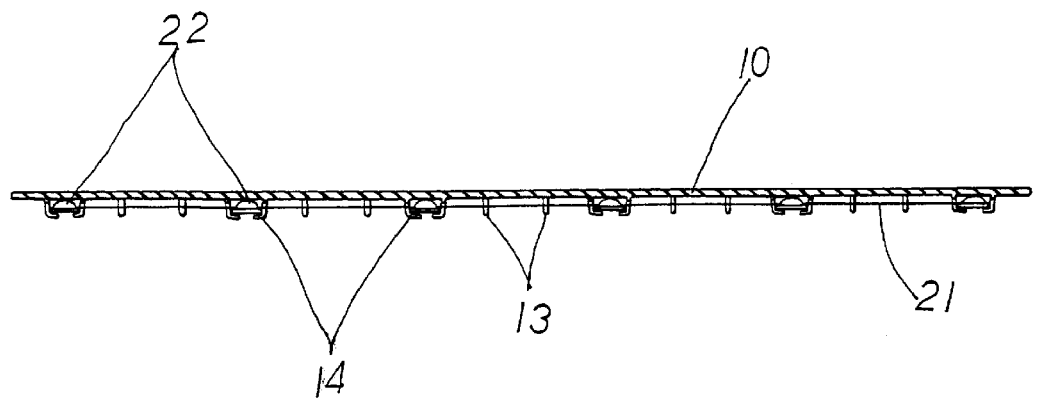
FIG. 12 is a partial cross sectional view of the mattress pad illustrating the still further arrangement or structure of the mattress pad.
Figure 13:
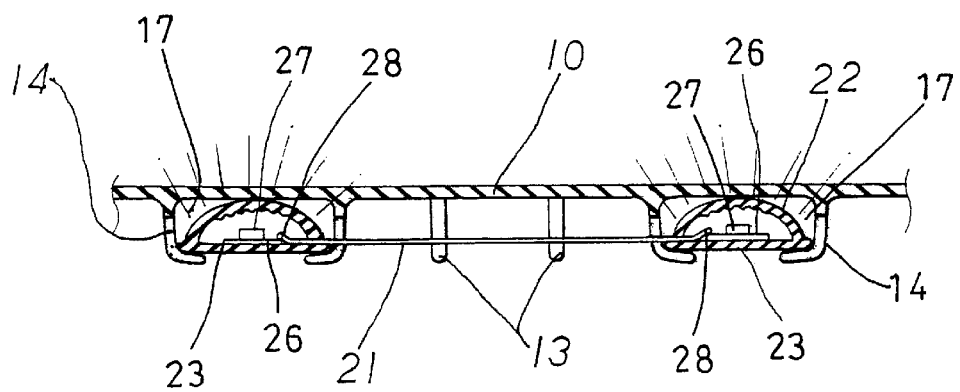
FIG. 13 is an enlarged partial cross sectional view of the 3 mattress pad as shown in FIG. 12.

Referring next to FIGS. 12 and 13, the pad body 10 may include a planar upper surface, and may include a number of projections 13 and arcs 14 extended downwardly therefrom, to form the spaces 17 in the arcs 14 respectively (FIGS. 11–13), and to receive the light members 22 of the light device 20 respectively.

Accordingly, the mattress pad for vehicle in accordance with the present invention includes a number of light members that may be engaged into the pad body for generating lights to light or illuminate the inner portions of vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mattress pad for vehicle comprising:
   a pad body including a bottom portion, and
   a light device including at least one light member attached to said bottom portion of said pad body, to generate light through said pad body, said pad body including at least one swelling provided therein and having a space formed in said at least one swelling to receive said at least one light member.

2. The mattress pad for vehicle as claimed in claim 1, wherein said pad body includes an opening formed in said at least one swelling and communicating with said space of said at least one swelling to receive said at least one light member.

3. The mattress pad for vehicle as claimed in claim 1, wherein said pad body includes at least one flange extended into said space thereof to engage with said at least one light member, and to retain said at least one light member in said at least one swelling of said pad body.

4. The mattress pad for vehicle as claimed in claim 3, wherein said pad body includes at least one second flange extended into said space thereof to engage with said at least one light member, and to define a gap between said at least one flange and said at least one second flange.

5. A mattress pad for vehicle comprising:
   a pad body including a bottom portion, and
   a light device including at least one light member attached to said bottom portion of said pad body, to generate light through said pad body,
   said at least one light member including a base, a circuit board attached to said base and having at least one light element disposed thereon.

6. The mattress pad for vehicle as claimed in claim 5, wherein said circuit board includes at least one terminal provided thereon, and a flexible and electrical cable coupled to said at least one terminal of said circuit board.

7. The mattress pad for vehicle as claimed in claim 5, wherein said base of said at least one light member includes an upper portion, and said at least one light member includes a cover secured onto said upper portion of said base, to form and define a chamber within and between said cover and said base.

* * * * *